Inventor
ELLEN L. SHOOK.
By Lester B. Clark
Ray L. Smith Attorneys.

Patented Jan. 20, 1948

2,434,723

UNITED STATES PATENT OFFICE 2,434,723

MEANS FOR MEASURING VOLUMETRIC SAMPLES

Ellen L. Shook, Port Arthur, Tex.

Application December 1, 1944, Serial No. 566,123

6 Claims. (Cl. 73—421)

The invention relates to a means for accurately measuring a volumetric sample of a fluid or of a granular material.

Very often it is difficult to measure accurately a volumetric sample due to the fact that the excess of the material taken into the measuring instrument cannot be released so as to insure the retention of an exact volume of the material. The present invention contemplates an instrument which may be made of glass, plastic or any suitable material whereby a volume of the material to be measured is taken into the instrument, any excess released, and then the instrument thereafter manipulated to release the predetermined volumetric sample that had been theretofore trapped therein.

Another object of the invention is to provide a measuring instrument having a sampling chamber connected with a pair of spaced, rotatable plug valves wherein the plug valves have a plurality of inclined passages connectable and disconnectable by turning the plugs so as to retain or release the sample and to release any excess and wash the instrument while the sample is retained.

Other and further objects of the invention will be readily apparent when the following description is considered in connection with the accompanying drawing, in which.

Figures 1, 2, 3:
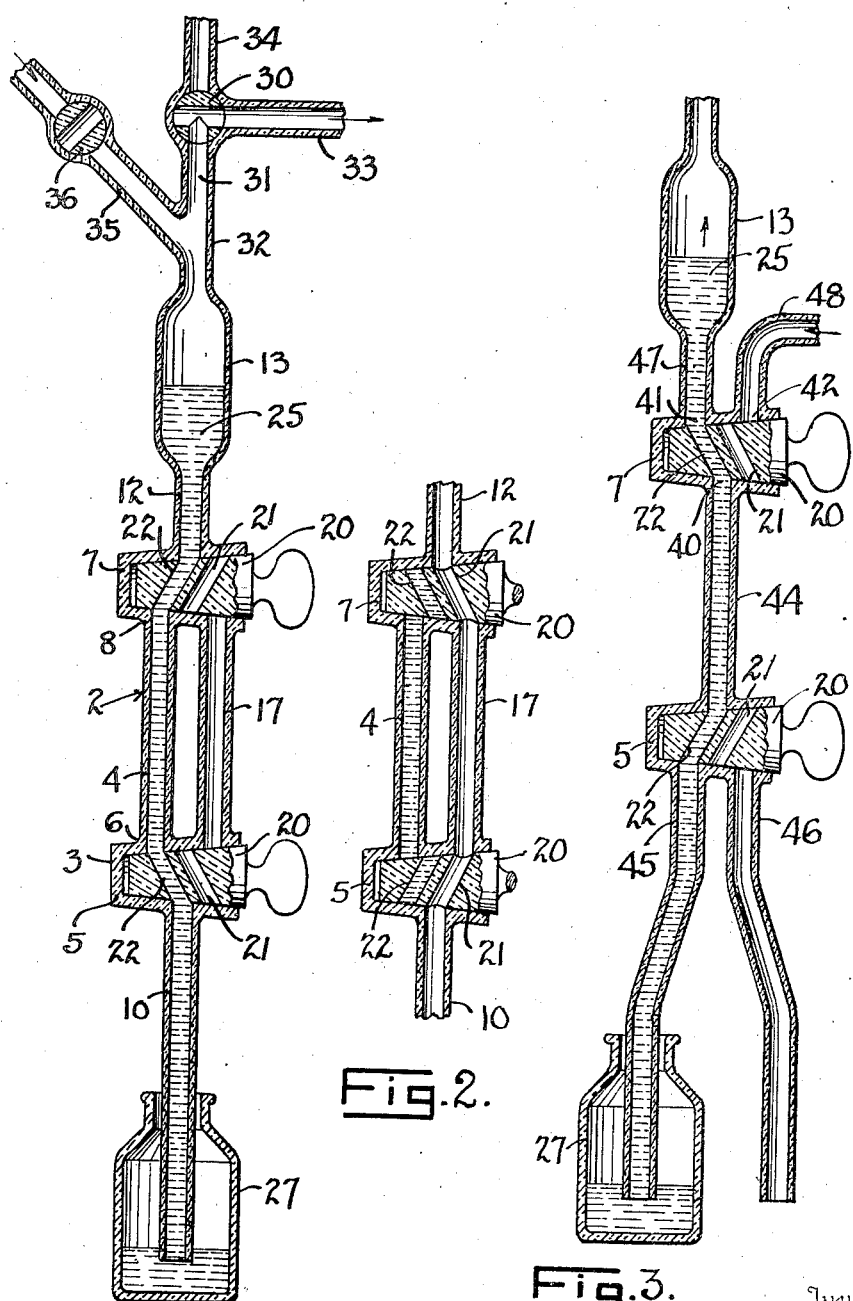
Fig. 1 shows a vertical sectional view of the instrument in operation with a volume of material having been taken thereinto.
Fig. 2 shows a vertical sectional view of the sampling portion of the instrument with the sample trapped therein and all excess material released.
Fig. 3 is a vertical sectional view of a slightly modified form of the instrument which is particularly adapted for use where the sample is to be diluted by the addition of a liquid which may be added for purposes of titration.

In Fig. 1 the instrument is indicated generally as 2 and includes a body 3 which comprises the sampling or measuring tube or conduit 4, which has the plug valve 5 connected at 6 to its lower end and the plug valve 7 connected at 8 to its upper end. A combination inlet and washing tube 10 is connected to the body of valve 5 centrally thereof, while the receiver chamber 12 is connected at the middle of upper valve 7 and has the enlarged portion 13 thereabove. The measuring tube or conduit 4 is positioned adjacent the bottom of the valve housings, while a by-pass tube 17 is connected adjacent the upper ends of the housings.

The plugs 20 of the valves 5 and 7 are identical and each is here illustrated as a tapered plug which has the inclined passages 21 and 22 disposed transversely thereof in an inclined position. It will be noted that these passages are so arranged that when the plugs are in the position shown in Fig. 1, the passages 22 will be aligned with inlet tube 10 and receiver chamber 12 to form a continuous connection through the instrument, and that when the plugs 20 are rotated or turned through a half turn or 180° then the passages 22 are moved out of alignment with not only the measuring tube 4 but with the inlet tube 10 and the receiving chamber 12 so that the volume of fluid which is in the passages 22 and the measuring tube 4 is isolated or trapped, as best seen in Fig. 2. This turning movement also serves to connect the passages 21 with the inlet tube 10 and receiver chamber 12 so that any excess material, such as 25 seen in the enlarged chamber 13 of Fig. 1, will be released to discharge from the instrument. The initial sample may have been taken from a beaker or other container 27 placed about the inlet tube 10 and this excess material 25 may return thereto.

After the excess material has drained from the instrument the beaker 27 may be removed and a suitable vessel placed under the inlet 10, and then the valves will be turned another half turn so as to reconnect the passages 22 and the measuring tube 4. The accurate volumetric amount of the sample is thus released and may flow into the vessel so that the operator knows that an accurate amount of fluid or material has been measured and metered into the vessel.

The top portion of Fig. 1 illustrates a three-way valve 30 so that the passage 31 in the tube 32, extending above the receiver chamber, may be connected to the lateral branch 33 or to the vertical branch 34, as desired. For instance, a suction or vacuum may be applied to either one of branches 33 or 34 in drawing a sample into the instrument from the beaker 27, or, of course, the instrument may be filled with fluid by closing the bottom of the inlet tube 10 and pouring the sample of fluid which is to be measured into the top of the instrument. The excess can be released and the sample measured by a procedure as heretofore described.

If it is desired to flush or wash the instrument of any excess material, the branch 35 may be used by connecting it to a suitable source of washing liquid or fluid. The valve 36 controls the opening or closing of this passage. After the sample has been trapped as seen in Fig. 2, the instrument may be washed with a suitable flushing fluid to flush out the receiving chamber and inlet tube while isolating the sample.

Very often a sample is to be diluted with a suitable solvent in order to titrate the sample or otherwise to examine or treat it. If desired, the fluid to be used for diluting the sample can be used in a predetermined volume to flush out the instrument either in the manner shown in Fig. 2 or after the excess has been released and the instrument is returned to the Fig. 1 position.

Fig. 3 shows a slightly modified form of the invention where the valve housings 5 and 7 of Fig. 1 have been turned through a one-half revolution so that the central opening 40 thereof is positioned between the two valves and the double passages 41 and 42 are on the outer sides of the valves. In this manner a single measuring tube 44 serves to connect the valves, while the tubing 45 serves as an inlet, the tube 46 as an outlet and the receiving chamber 47 and the flushing connection 48 are both connected to the upper valve 7. In this manner a suction on the receiver 47 will draw a sample in from the beaker 27 with the parts in the position shown in Fig. 3. This sample is then of the volume of the tube 44 between the two valves and does not include any of the volume of the passages 22, as described in connection with the instrument in Fig. 1. The turning of the valves then connects the passages 21 to the tube 44. This connection is both above and below the ends of tube 44 and is arranged to release the sample from tube 44 into outlet 46 due to the opening of the flushing passage 48 at the top. The excess material, of course, was isolated by the turning of the valves. This form of instrument is particularly adapted for use where the flushing fluid is used to dilute the sample and, of course, it may be introduced through tube 48.

The invention is particularly adapted for accurate calculation and use in measuring samples of acid, caustic or oil where a different solvent than water is used as the flushing fluid. It may be used in measuring accurate volumes of gasoline, water or other fluids which would not require flushing of the instrument. The instrument is adapted for use particularly where accurate samples of acid and caustic are diluted by large volumes of other fluids in order to determine the analysis and contents thereof. The instrument is also of utility in the filling of prescriptions where an accurate volumetric portion is desired. This method of segregating samples is accurate, is rapid and is simple, making it especially adapted for use in plant control analysis where the operator has not necessarily had laboratory training yet needs to carry out accurate analyses.

What is claimed is:

1. An instrument for the measurement of a sample of fluid comprising a sample receiving chamber including a valve at each end thereof, an inlet to said chamber beyond one valve, a receiver portion beyond the other valve, means to apply a suction to the instrument above said receiver, additional means to introduce a washing fluid, and means including a passage through each of said valves to release the excess of the material from said receiver to escape through said inlet upon the turning of the valves to trap the sample.

2. An instrument for isolating a predetermined volume of a fluid including a chamber in the instrument, a rotatable plug valve at each end thereof, a pair of parallel passages through each plug, a second chamber connecting said valves and arranged to align with one of the passages in each valve, said valves being turnable to fill said chamber and one passage in each valve so as to contain a sample of a predetermined volume and thereafter turnable to trap said volume and release any excess, and still further turnable to the initial position to release the volume thus measured.

3. A sample measuring instrument comprising a hollow member, a plug valve mounted therein having a rotatable plug, a pair of inclined passages through said plug so disposed that one end of one passage may be connected to the hollow member in one position and when turned a half turn the other end of the other passage will be connected to said hollow member, a pair of spaced conduits connected to the other side of said valve and disposed to be connected alternately to said hollow member by turning of the valve plug and the passages therein; a second valve on the other end of said conduits of the same construction as said first valve, a receiver chamber connected to said second valve to be connected to one or the other of the passages in said second valve, so that a sample drawn into one of said conduits by a suction on said receiver may be trapped by turning both valves to simultaneously release any excess of the sample, and to release the measured sample in the conduit upon an additional turning of the plugs of said valves.

4. A sample measuring instrument comprising a hollow member, a plug valve mounted therein having a rotatable plug, a pair of inclined passages through said plug so disposed that one end of one passage may be connected to the hollow member in one position and when turned a half turn the other end of the other passage will be connected to said hollow member, a pair of spaced conduits connected to the other side of said valve and disposed to be connected alternately to said hollow member by turning of the valve plug and the passages therein; a second valve on the other end of said conduits of the same construction as said first valve, a receiver chamber connected to said second valve to be connected to one or the other of the passages in said second valve, so that a sample drawn into one of said conduits by a suction on said receiver may be trapped by turning both valves to simultaneously release any excess of the sample, and to release the measured sample in the conduit upon an additional turning of the plugs of said valves, and additional means to introduce a washing liquid to said receiver to wash the instrument.

5. A glass or the like instrument for measuring a predetermined volume of a sample of fluid which instrument comprises tubing and a pair of valves, said valves being spaced apart by a section of the tubing of a predetermined volume, said valves each having spaced independent inclined passages in the plug thereof so that a volume of fluid taken into the instrument may be isolated by turning of the valves to admit the fluid to said section of the tubing through one of the passages of each valve, and to thereafter release the fluid from said section by additional turning, and a bypass tube also connecting said valves and adapted to communicate with each of said other passages in the valves to bypass liquid around the isolated sample.

6. A measuring instrument comprising a body having a chamber therein, a plug valve at each end of the chamber, there being a pair of passages through the plug of each valve, so that one of the passages of each pair forms a passage to admit fluid to the chamber and turning of the valves after the instrument has the fluid to be measured therein serves to trap a predetermined volume of the fluid in the chamber, and additional turning serves to release the measured sample, and a bypass tube also connecting said valves and adapted to communicate with each of said other passages in the valves to bypass liquid around the trapped sample.

ELLEN L. SHOOK.

REFERENCES CITED

The following references are of record in the file of this patent:

UNITED STATES PATENTS

| Number | Name | Date |
| --- | --- | --- |
| 688,449 | Tutwiler | Dec. 10, 1901 |
| 2,149,303 | Markwood | Mar. 7, 1939 |
| 919,943 | Peterson | Apr. 27, 1909 |
| 1,520,637 | Frank | Dec. 23, 1924 |
| 1,837,858 | Grace | Dec. 22, 1931 |
| 2,006,549 | Hartley | July 2, 1935 |
| 2,083,480 | Spence | June 8, 1937 |

FOREIGN PATENTS

| Number | Country | Date |
| --- | --- | --- |
| 329,315 | Great Britain | May 9, 1930 |
| 405,092 | Germany | Nov. 1, 1924 |
| 850,941 | France | Sept. 25, 1939 |